United States Patent [19]
Wingert

[11] Patent Number: 5,735,444
[45] Date of Patent: Apr. 7, 1998

[54] INSULATED STAPLE DRIVING SYSTEM

[75] Inventor: Rudolf Wingert, West Milford, N.J.

[73] Assignee: Arrow Fastener Co., Inc., Saddle Brook, N.J.

[21] Appl. No.: 717,630

[22] Filed: Sep. 23, 1996

[51] Int. Cl.[6] .................................. B25C 5/02; B27F 7/00
[52] U.S. Cl. ............................ 227/120; 227/119; 227/136
[58] Field of Search ................................ 227/109, 119, 227/120, 135, 136, 151, 152, 107

[56] References Cited

U.S. PATENT DOCUMENTS

| | | | |
|---|---|---|---|
| 4,257,548 | 3/1981 | Stubbings | 227/8 |
| 4,389,012 | 6/1983 | Grikis et al. | 227/120 |
| 4,424,929 | 1/1984 | Weis | 227/120 |
| 4,537,343 | 8/1985 | Johansson | 227/120 |
| 4,801,061 | 1/1989 | Mangone, Jr. | 227/120 |
| 4,801,064 | 1/1989 | Mangone, Jr. | 227/120 |
| 4,805,824 | 2/1989 | Erickson | 227/120 |

*Primary Examiner*—Joseph J. Hail, III
*Assistant Examiner*—Jay A. Stelacone
*Attorney, Agent, or Firm*—Fitzpatrick, Cella, Harper & Scinto

[57] ABSTRACT

A staple driving system for driving insulated staples to secure an object to a base which includes staples having a generally U-shape including parallel legs with free end portions. A molded body formed of insulating material is located on the free end portions of each staple and is slidable with respect thereto when the staple is driven. The molded body has a generally semi-circular recess formed therein between the legs of the staple for surrounding and engaging a cable, wire, or the like. The molded insulating body of one staple is connected by frangible connections to an adjacent molded body of an adjacent staple so that the staples can be shipped and used in a strip. A staple gun having a magazine formed to receive and guide the insulated staples is also provided along with a pusher shaped to cooperate with guide ribs on the magazine while engaging the molded body and the bight of the last staple of a strip in the magazine to accurately guide the staples in the magazine during operation of the system.

6 Claims, 3 Drawing Sheets

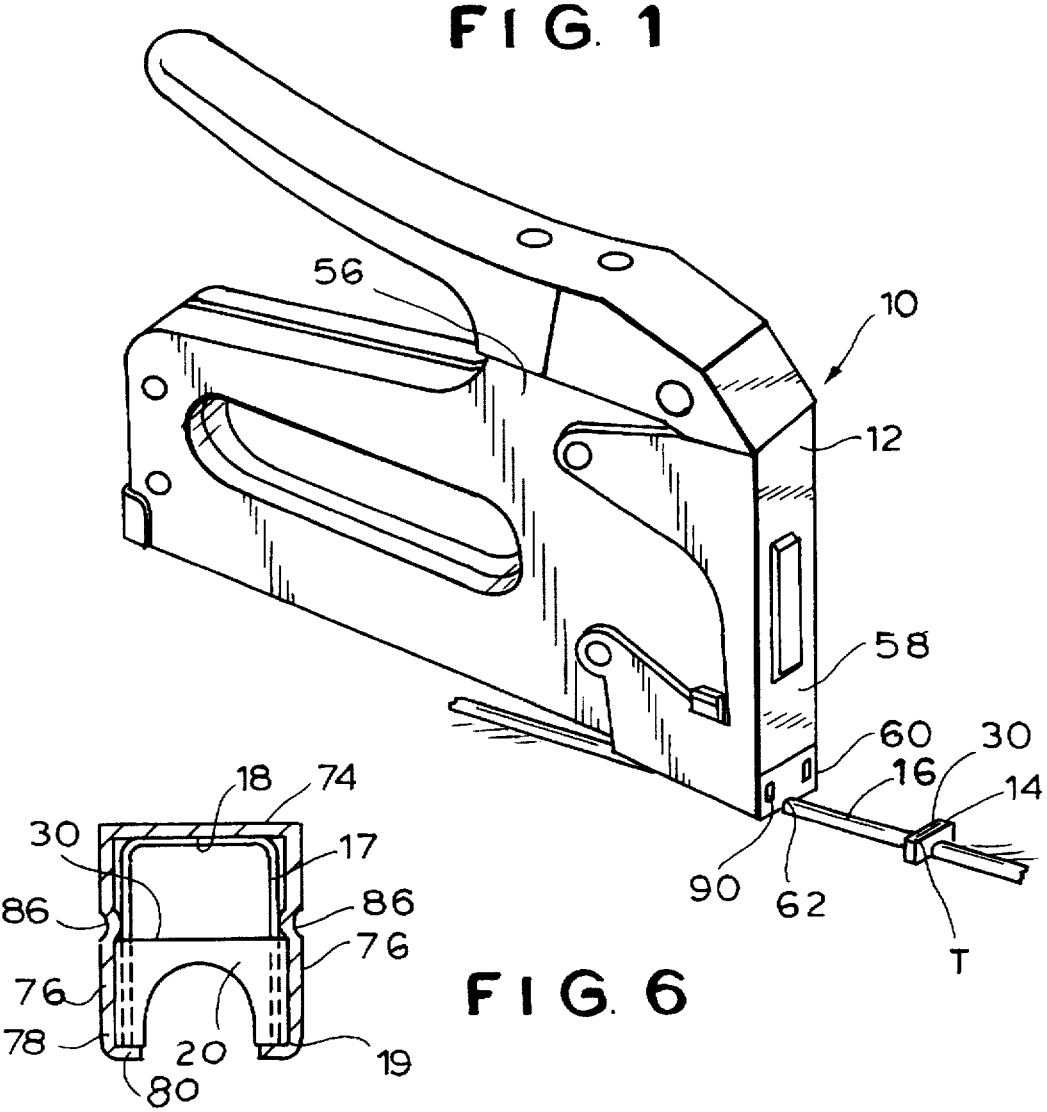
FIG. 1
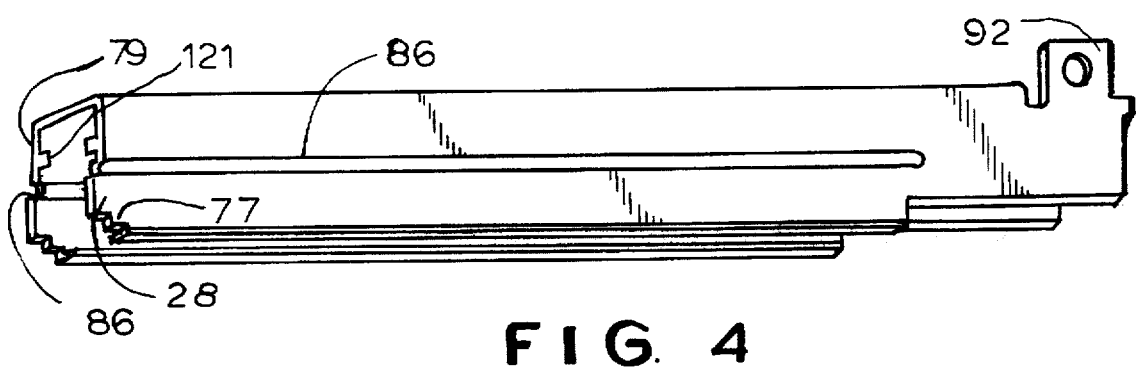
FIG. 6
FIG. 4

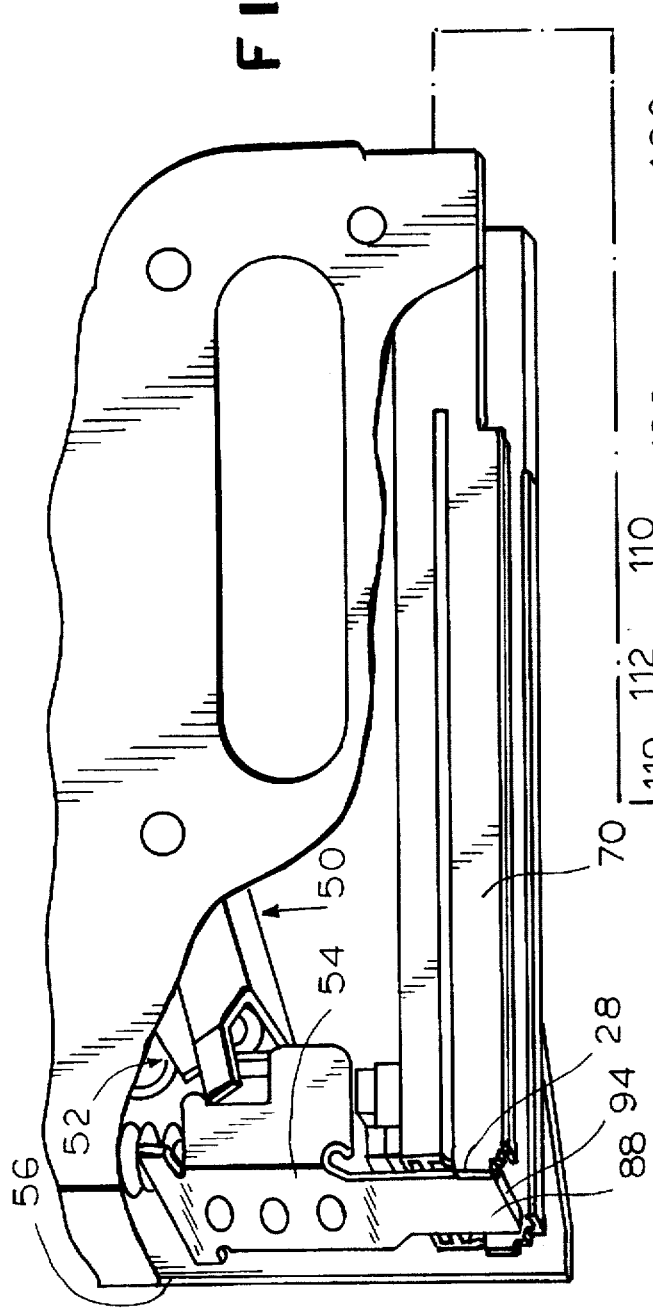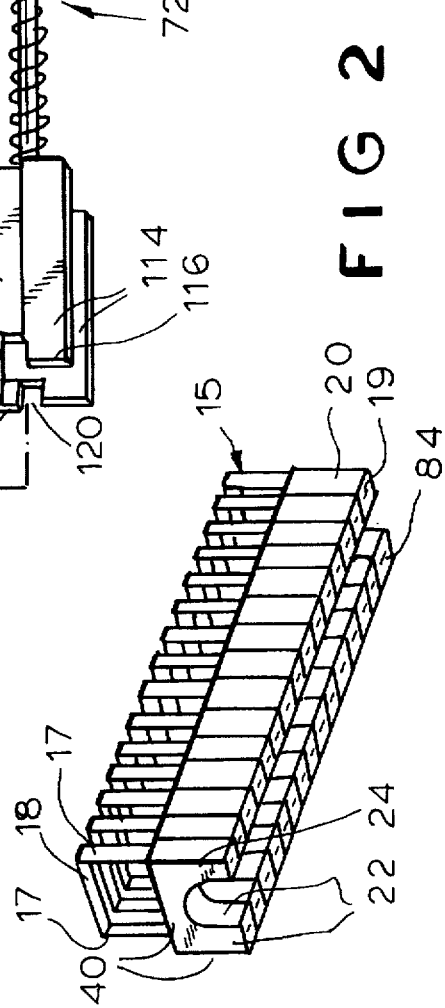

INSULATED STAPLE DRIVING SYSTEM

The present invention relates to a staple driving system and more in particular to a system for driving insulated staples adapted to be used in securing electrical wires, television cables, and the like, to a support base or surface.

It has long been recognized that securing electrical wiring or television wiring, computer wiring, and the like, to a support base or surface by the use of metal securing devices such as staples, is a simple and efficient process. However, since staples are either driven by hand or by existing staple gun devices, the danger always exists of penetrating the insulating covering of the wiring during the stapling operation, thereby damaging the wiring and possibly causing injury to the installer. In order to combat these problems, insulating staples of various types have been previously proposed. The most common of such staples include saddle strips of insulating material such as felt or synthetic material wherein a saddle of material is installed on the staple adjacent the bight of the staple and simply engages the cable when the staple is driven. Insulating staples of this type are shown, for example, in U.S. Pat. Nos. 420,635; 662,587; 843,916; 2,001,288; 2,127,665; and 2,323,362.

Another form of staple intended for the same purpose is shown in U.S. Pat. Nos. 3,787,608; 3,894,174; and 3,940,844. As seen in those patents, individual staples adapted to be driven by hand, i.e., with a hammer, are provided in which preformed insulated tubing is positioned over the bight portion and upper portions of the legs of the staple when it is manufactured. The staple is then just simply driven into place.

Yet another prior art device for securing electrical cables to a support surface or base is shown in U.S. Pat. No. 2,901,200. In that case, an insulating body is provided that generally conforms to the shape of the cable and has two nails penetrating the body which are adapted to be nailed into place in the support by a hammer or the like. Similar devices are shown in U.S. Pat. Nos. 4,801,061 and 4,801,064 which are apparently driven by a substantially modified staple gun.

A further prior art insulating clip is shown in British Patent No. 1,554,602 which discloses a strip of molded saddle members, each of which holds a staple on its periphery and is apparently driven by a conventional staple gun.

It is an object of the present invention to provide a staple driving system which is adapted to drive an insulated staple uniformly and accurately with a conventional staple driving mechanism.

Yet another object of the invention is to provide a staple driving system which is adapted to drive a uniform strip of staples inserted in the magazine of a staple gun tacker, with the magazine holding the staples in position for driving while avoiding twisting and jamming of the staples.

Another object of the invention is to provide a staple driving system which is relatively simple in construction and inexpensive to manufacture.

In accordance with an aspect of the present invention, a staple driving system is provided for driving an insulated staple that is used to secure a wire, or the like, to a support surface. The staple includes a generally U-shaped metal staple having a pair of substantially parallel penetrating legs including free end portions adapted to penetrate a support. The staple includes a bight portion extending between the legs above the free end portions thereof. A molded body formed of an electrically insulating material is located on the free end portions of the staple. The molded body has a generally semi-circular recess formed therein located between the legs of the staple and opening outwardly away from the bight of the staple to be selectively positioned over a wire. The recess in the molded body defines leg portions on opposite sides of the body which surround and slidably receive the legs of the staple. The molded body has a bight portion extending between its leg portions which has an upper surface portion including a recess formed therein facing the bight of the staple and being generally complementary thereto. As a result, when the staple is driven its legs slide through the molded body until its bight portion is engaged in the bight portion of the elastic body which then protects the wire from contact with the staple's metal legs and bight.

The staple gun used in the system of the present invention includes a housing containing a staple driving mechanism of proven strength and durability as disclosed in U.S. Pat. Nos. 2,671,215 and 2,754,515, and sold for many years by the Arrow Fastener Company. In accordance with the present invention the staple gun includes a new magazine and pusher structure to cooperate with the insulated staples to assure proper positioning and driving of the staples.

The magazine used in the system of the invention includes an elongated support frame having a top, vertical sides and a pair of inwardly directed flanges extending from the sides beneath the magazine top for supporting the bases of the molded bodies on opposite sides of the semi-circular recess formed therein. The magazine has open front and rear ends with the front end being located adjacent the discharge opening of the staple gun's housing. The vertical sides of the track are engaged in the front wall of the staple gun housing and the flanges terminate at a position spaced from the staple gun's front wall to define a staple discharge space through which the staples are discharged.

The pusher has a generally U-shaped head with a bight portion, a pair of spaced legs and spring means for biasing the head into engagement with the last staple in a strip positioned in the magazine. The pusher head is inverted in the track and the lower sections of its legs are positioned to engage the molded bodies of the last staple of the strip in the magazine. The sections of the pusher legs adjacent the pusher's bight portion are flared outwardly towards the side walls of the magazine to engage stops formed in the magazine walls which limit the forward motion of the pusher in the magazine after the last staple is driven, so as not to interfere with the operating mechanism of the staple gun after the last staple is driven.

The above, and other objects, features and advantages of this invention will be apparent in the following detailed description of an illustrative embodiment thereof, which is to be read in connection with the accompanying drawings, wherein:

FIG. 1 is a perspective view of a staple driving system for insulated staples constructed in accordance with the present invention;

FIG. 2 is a perspective view of a strip of insulated staples in accordance with the present invention;

FIG. 3 is an exploded view, with parts broken away showing the staple gun, magazine and pusher of the system of the present invention;

FIG. 4 is a perspective view of the magazine of the staple gun shown in FIG. 3;

FIG. 6 is a sectional view of the magazine with staples installed taken along line 6—6 of FIG. 5.

Figure 7:
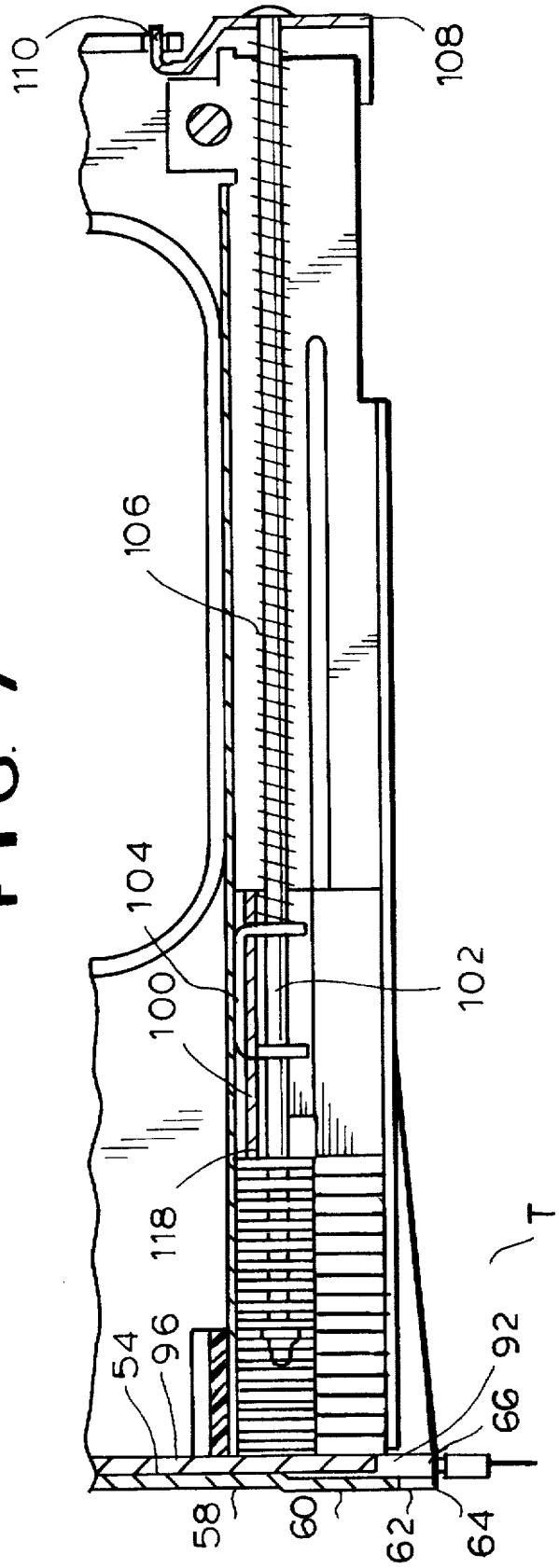
FIG. 7 is a side sectional view taken along line 7—7 of FIG. 5.
Figure 5:
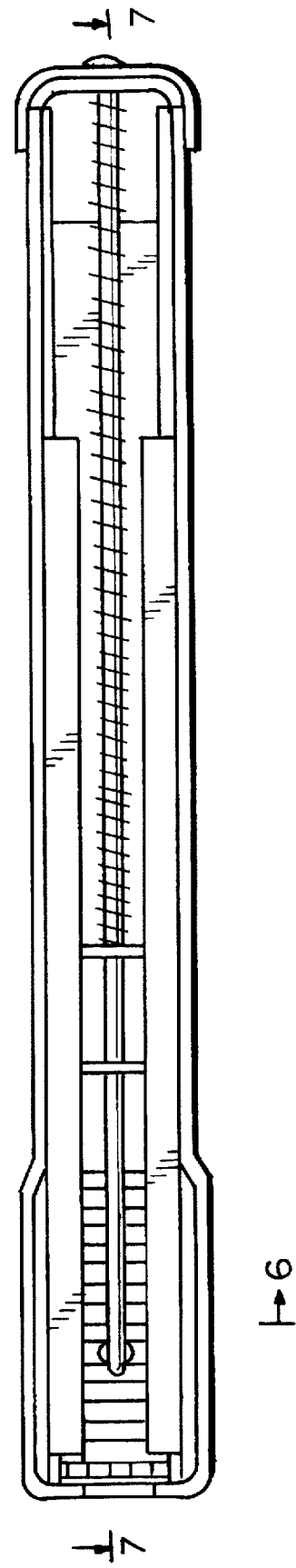
FIG. 5 is a bottom view of the staple gun shown in FIG. 3.

Referring now to the drawings in detail, and initially to FIG. 1, a system 10 for driving insulated staples in accordance with the present invention is illustrated. System 10 includes a staple gun 12 constructed to drive insulated staples 14 over wire 16 or the like.

Insulated staples 14 each include a metal staple 15 of conventional construction (FIG. 2) having a pair of generally parallel leg portions 17 and a bight portion 18 connecting the legs. Legs 17 include lower free end portions 19 (FIG. 6) which are adapted to penetrate the base or support surface T into which the staple is to be driven.

In accordance with the present invention, staples 14 each have a molded body 20 formed on the free end portions of the legs 17. Molded body 20 is formed of an insulating material, such as a thermoplastic resin, or the like, which is non-conductive to electricity. Molded body 20 has a generally rectangular peripheral configuration, but includes a central recess 22 formed therein. The recess is dimensioned to conform generally to the circular cross-section of the size or gauge wire that is to be secured with the staple. The recess opens outwardly in the same direction as the staple.

Recess 22 in molded body 20 defines a pair of legs 24 which surround and slidably receive the ends of staple legs 17. By this arrangement when the staple is placed over the wire to be secured in place it is fully protected from contact with any metal surfaces of the staple.

Molded insulating body 20 has an upper surface 30 (FIGS. 1 and 6) which includes a recess 32 formed therein. The recess is generally complementary in shape to the bight portion 18 of the staple 15. Thus, as seen in FIG. 1, when the staple 15 is fully driven, its bight portion 18 enters the recess of the molded body 20. This further protects the wire against contact with the metal portion of the staple and provides a cushion on the wire partially absorbing the driving force of the impact from the staple gun.

The construction of the present invention enables a plurality of insulated staples to be formed at the same time in a molding operation wherein, for example, the staples are installed in spaced slots in a mold into which moltent insulating material is poured or injected. In addition, by this construction, the molded bodies can be secured to each other by frangible pieces 40 of insulating material integrally molded with the molded bodies during the molding operation. As a result, a strip of insulated staples, as seen in FIG. 2, is provided which is easily installed in a staple gun in the conventional manner.

As seen in FIG. 2, the frangible connecting pieces 40 are located along the periphery of the recess 22 in the molded body. These connecting pieces are formed of predetermined dimensions sufficient to hold the molded bodies together in a strip so that the strip will not break apart when handled normally, but which will sever when the staple is driven in the staple gun.

By this construction it is seen that during the driving operation at no time will the metal components of the staple be positioned adjacent to the wire being secured in place. During the entire driving operation, the wire is surrounded by the insulated body and the staple moves with respect to the body into the support.

Staple gun 12 is generally of conventional construction except as described hereinafter. The staple gun is basically a conventional Arrow T-50® brand staple gun such as disclosed in U.S. Pat. Nos. 2,671,215 and 2,754,515, the disclosures of which are incorporated herein by reference. The drive mechanism using a double lever linkage system 52 to reciprocate and drive a driver or knife 54 (FIG. 3) that drives the staples.

The staple gun includes a housing 56 having a front wall 58 including a nose 60 whose bottom edge 62 is shaped to overlie and receive cable 16. The bottom 64 of housing 56 defines a staple discharge opening 66 through which the staples are driven by knife 54.

In accordance with the present invention, staple gun 12 is provided with an improved magazine or track 70 to hold the staple strip and an improved spring biased pusher 72 to advance the staple strip during operation of the staple gun.

Magazine 70 is a generally inverted U-shaped metal frame having a bight portion 74 (FIGS. 4 and 6) and a pair of spaced apart vertical legs 76. The lower ends 78 of legs 76 include inwardly extending flanges 80 on which the bases 84 of molded bodies 20 will slide. Flanges 80 thus support the strip in the magazine with minimal friction during movement.

Magazine 70 also includes embossed longitudinal ribs 86 formed in side walls 76 to aid in guiding the staples. As seen in FIG. 6, ribs 86 extend inwardly at an elevation above the top surface 30 of molded body 20 to contact the staples themselves and provide lateral stability during movement of the strip in the magazine. The ribs also serve to resist twisting of the molded body on the staples during the driving operation. More specifically, when the knife 54 of the staple gun has driven a staple and begins to drive the next staple it moves upwardly in the staple gun in frictional engagement with the molded body of the adjacent staple. This applies an upwardly directed friction force to the molded body which could cause it to slide up on the legs of its associated staple and become misaligned with it. Because the bodies are connected, this could misalign adjacent bodies as well. As seen in FIG. 6, ribs 86 engage the upper surface of the bodies 20 and prevent relative movement between the bodies and the staples.

Magazine 70 is mounted in housing 12 by a pair of projecting fingers 28 on the lower portion 77 of the front ends of walls 76. The fingers are received in complementary slots 90 formed in nose 60. The rear end 92 of the magazine is secured to housing 12 by a rivet 94, or the like.

As seen in FIGS. 3, 4, 5 and 7, the flanges 80 of magazine 70 are slightly shorter than the lower ends 77 of walls 76 so that they terminate in spaced relation to nose 60, thereby providing a discharge opening 92 through which a staple can be driven. Similarly, the upper portions 79 of walls 76 are shorter than the lower portion 77 to allow the knife 54 to pass in front of upper magazine portion 79 to drive the staples. Thus, as seen in FIG. 7, a staple 14 can be driven through opening 92 into workpiece T. The driving operation drives the staple through body 20 until the bight of the staple engages the top of body 20, then drives body 20 away from the strip breaking elements 40. As illustrated in FIG. 7, knife 54 is in its rest position where its end 96 blocks advance of the staple strip after a prior staple has been driven. When the handle of the staple gun is squeezed or depressed, knife 54 is lifted by the mechanism to a position above the top of the staples, as shown by dotted line 96. This permits the staple strip to advance and position the next staple in line beneath the knife. When the mechanism releases the knife it is driven down against the staple to drive it.

Pusher 72 is of generally conventional construction except for its head 100. The pusher includes a rod 102 which is slidably mounted in a clip 104 mounted in head 100 (FIG. 7). A coil spring 106 surrounds rod 102 and is captured between clip 104 and the rear latch member 108 which is fixed to rod 102 in a conventional manner. The head 100 is adapted to fit and slide within magazine 70 under the bias of spring 106. The latch 108 holds the rod in place by a latch 110 in a conventional manner.

The structure of head 100 is designed specifically for the system of the present invention. The head is an inverted U-shaped member having a bight portion 112 (FIG. 3) and a pair of opposed vertical legs 114. The lower ends 116 of legs 114 are laterally spaced apart slightly more than the upper ends 118 thereof. The lower ends 116 are thus located to engage the rear of the last molded body 20 on the staple strip. The forward side portions 119 of the upper ends 118 of legs 114 are slightly flared (FIG. 7) to a spacing about equal to that of the lower legs. The free ends of portions 119 are thereby positioned to engage stops 121 formed on the inner surfaces of the magazine walls 76. This limits the forward movement of the pusher in the magazine so that it does not block the path of travel of the knife 54 after the last staple is driven (See FIGS. 5 and 7). The narrower spacing of upper ends 118 of head 100 allow the head to be inserted in the magazine with the wider lower ends 116 below the magazine ribs 86. Notches 120 are formed in the pusher where the front end 119 is flared to receive ribs 86 of the magazine and maintain proper alignment between the pusher head and the magazine.

Although an illustrative embodiment of the present invention has been described herein with reference to the accompanying drawings, it is to be understood that the invention is not limited to that precise embodiment and that various changes and modifications may be affected therein to those skilled in the art without departing from the scope and spirit of this invention.

What is claimed is:

1. A staple driving system comprising:
   a staple gun; and
   a strip of insulated staples for securing an object to a support surface and adapted to be installed seriatim with said staple gun,
   said strip of staples comprising
   i) a plurality of staples, each of which comprises a generally U-shaped staple having substantially parallel legs including free end portions and a bight portion extending between said legs, and
   ii) a plurality of molded bodies of insulating material respectively molded on said staples, each of said molded bodies having a base adapted to be engaged with a support surface and a generally semi-circular recess formed therein between the legs of said staple, said semi-circular recess opening towards said base with its widest portion located at the base, whereby the body may be installed over the object to be secured to the support surface in a direction perpendicular to the support surface while within said staple gun,
   each of said molded bodies including a top portion generally complementary to the bight portion of its associated staple, said top portion of the molded body having a recess formed therein for receiving said bight portion when the staple is driven into a base, said molded body having a wall portion between the recess of said top portion and said generally semi-circular recess; and frangible means on each of said molded bodies for releasably securing the molded bodies to form said continuous strip of staples, said frangible means being integrally molded with said bodies and holding the bodies in closely spaced relation with each other;
   said staple gun including
   a housing having a staple discharge opening;
   a magazine track for holding said strip of staples;
   pusher means for advancing staples in said strip to said staple discharge opening during operation of the staple gun; and
   means for driving a staple from said strip out of said discharge opening;
   said magazine track comprising an elongated support frame having a top, vertical sides and a pair of inwardly directed flanges extending from said vertical sides beneath said top for supporting the bases of said molded bodies on opposite sides of the semi-circular recess formed therein; said track having open front and rear ends, with said front end being located adjacent the discharge opening of the staple gun housing, said vertical sides of the track being engaged in a wall of the staple gun housing and said flanges terminating at a position spaced from said staple gun housing wall thereby to define a staple discharge space through which said staples are discharged, said magazine track further comprising elongated inwardly extending ribs formed thereon located to engage the parallel legs of the staples to guide the staples in said magazine track and located to engage the top portion of said molded bodies to resist movement of the bodies relative to their associated staple while in the magazine track;
   said pusher means having a generally U-shaped head having a bight portion and a pair of spaced legs and means for biasing said head into engagement with the last staple in said strip, said head being inverted in said track, said pair of spaced legs having first lower sections positioned to engage the molded body of the last staple of the strip whereby the staple and its associated molded body are held uniformly in the track.

2. A staple driving system as defined in claim 1 wherein the bight of the staple is flat.

3. A staple driving system as defined in claim 2 wherein said frangible means comprise a plurality of integral connector pieces of thin frangible cross-section extending from said body.

4. A staple driving system as defined in claim 3 wherein said frangible pieces are located along the periphery of the recess formed in said body.

5. A staple driving system as defined in claim 1 wherein said pusher means has notches formed therein for cooperating with said ribs.

6. A staple driving system as defined in claim 5 including stop means in said magazine track for cooperating with ends of said pusher means to limit forward movement of the pusher means in the magazine track after the last staple is fired.

* * * * *